(12) United States Patent
Fick et al.

(10) Patent No.: US 12,432,209 B1
(45) Date of Patent: Sep. 30, 2025

(54) RESTRICTED ACCESS CONTROL IN MULTI-TENANT SYSTEMS USING TENANT-SPECIFIC SECURITY PRINCIPALS

(71) Applicant: Amazon Technologies, Inc., Seattle, WA (US)

(72) Inventors: Garret Michael Fick, New York, NY (US); Brad Boswell, Seattle, WA (US); Balaji Narayanan Iyer, Novi, MI (US); William Leslie Kruger, Westford, MA (US); Dain Steenberg, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 17/936,242

(22) Filed: Sep. 28, 2022

(51) Int. Cl.
*H04L 9/40* (2022.01)

(52) U.S. Cl.
CPC .................................. *H04L 63/101* (2013.01)

(58) Field of Classification Search
CPC ......... H04L 63/0815; H04L 63/10–102; H04L 63/105; H04L 63/20
See application file for complete search history.

(56) References Cited

U.S. PATENT DOCUMENTS

| | | | |
|---|---|---|---|
| 2021/0044594 A1* | 2/2021 | Tamura | H04L 63/102 |
| 2021/0318857 A1* | 10/2021 | Chitgupakar | G06F 9/547 |

* cited by examiner

*Primary Examiner* — Kevin Bechtel
(74) *Attorney, Agent, or Firm* — Nicholson De Vos Webster & Elliott LLP

(57) ABSTRACT

Techniques for restricted access control in multi-tenant systems using tenant-specific security principals are described. A multi-tenant system can define a tenant-specific security principal for a particular workload, and a separate resource owner can assign access rights to the tenant-specific security principal for use in executing the workload. A client seeking to invoke the execution of the workload can provide authorization, to the multi-tenant system, to utilize the tenant-specific security principal for the execution.

20 Claims, 8 Drawing Sheets

RESTRICTED ACCESS CONTROL IN MULTI-TENANT SYSTEMS USING TENANT-SPECIFIC SECURITY PRINCIPALS

BACKGROUND

Access control systems dictate under what circumstances access is allowed to a resource for a particular user or system. Access control decisions are generally a multi-step process, typically modeled as authentication then authorization. The authentication step identifies the "who" (or what) is seeking to access a resource, which is formally called the security principal. Authorization is an access control decision to approve or reject (in part or in whole) a particular attempt to access to a resource, which typically occurs based on rights associated with the security principal.

There are a variety of access control realizations in the software systems domain. In the traditional client-server authentication model, client requests to a server may include the client's credentials within (or with) the request. The recipient server thus validates the credentials to make an authentication-based access control decision. In a traditional client-server authorization model, client requests to the server include an assertion that claims the rights to access a resource. The server validates this assertion to make an authorization-based access control decision.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for restricted access control in multi-tenant systems using tenant-specific security principals. According to some examples, a multi-tenant system such as a multi-tenant compute provider that performs workflows of operations for various tenants can define a tenant-specific security principal with an authorization service. An owner or manager of one or more resources (such as functions, data, compute capacity, etc.) needed to be accessed (e.g., created, read, written/updated, and/or deleted) as part of the workflow can assign access rights to this tenant-specific security principal, while the multi-tenant system itself is unable to do so. Thereafter, a client seeking to execute a workflow can obtain and provide a grant, to the multi-tenant system, to utilize the tenant-specific security principal. With this grant, the multi-tenant system can obtain authorization to use the tenant-specific security principal, which provides the system the limited ability to access necessary resources in a constrained secure manner that is in direct contrast to a typical technique of granting the system itself broad permissions to access resources of a resource owner, which is inherently risky and can allow for purposeful abuse on the part of malicious actors or inadvertent misuse based on misconfigurations, software bugs, or the like. Instead, examples described herein can allow for resource owners to control what access rights are assigned to a particular workflow and when and how the multi-tenant system can obtain and use those rights. Thus, while a multi-tenant system can maintain ownership of a workflow (or "workload" or "task") and register this workflow definition, the system does not directly own the rights to use the workflow (and access the associated resources), which are instead owned and controlled through assignment on the part of the resource owner.

Figure 1:
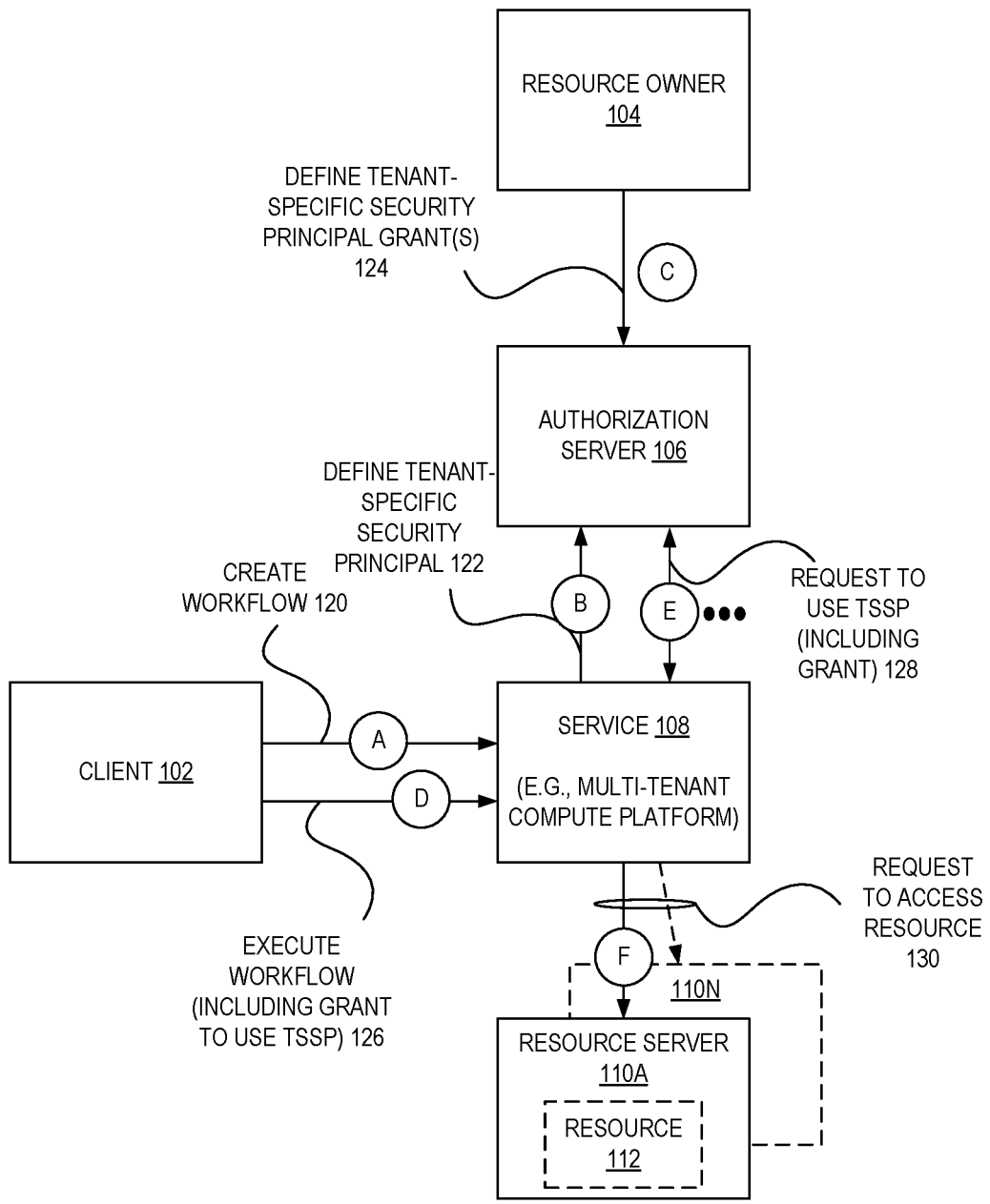
FIG. 1 is a diagram illustrating a configuration for restricted access control in multi-tenant systems using tenant-specific security principals according to some examples.

FIG. 1 is a diagram illustrating a configuration for restricted access control in multi-tenant systems using tenant-specific security principals according to some examples. In FIG. 1, one exemplary realization of a client-server authorization model is shown that includes four system roles: a resource owner 104 (e.g., a human, system, group, etc., having ownership of some computing resources 112), one or more resource servers 110A-110N (managing and/or providing the computing resources 112), a client 102 (e.g., a software application seeking to access or utilize the computing resources 112 in some manner, or just seeking to utilize a service 108 that itself utilizes the computing resources 112), and an authorization server 106.

Generally, using a common client-server authorization model, a client 102 obtains an assertion from an authorization server 106. In some examples, an assertion is a message that is obtained from an identity provider (IdP) that confidentially identifies who a user is, what pertinent information exists about them, and what they're authorized or entitled to access. An assertion may also specify security conditions (such as the source of the assertion) and assurances that assertions are valid.

Thereafter, client 102 requests sent to a resource server 110A (e.g., to perform an operation involving one or more resources 112) can include the assertion within the request, and the resource server 110A can validate the assertion for the resource owner 104 to make an access control decision.

Multi-tenant software systems—such as a service 108—share system components between tenants while maintaining separation between tenant-specific resources. One such realization is to share a same physical computer or storage device while isolating access to resources through (typically) software controls. One type of such service 108 can be a multi-tenant compute provider (CP), which is a class of multi-tenant software system that provides "compute" as the tenant-specific resource. Such systems are different from multi-user systems in that the specific compute resources are not exposed to the user.

In computing, the principle of "least privilege" is an information security concept that requires each component in a system to be restricted to only the required resources necessary for a legitimate purpose. Thus, there is a desire for services 108 such as multi-tenant compute providers to operate with least privilege.

In some examples, services 108 can define tenant-specific security principals ("TSSP") but only use these TSSPs in the context of an independent authorization grant. Grants are assigned to the TSSP, while the service 108 has no ability to define these grants. Thus, service 108 access to other resources achieves least privilege by restricting the service's 108 use of the security principal.

As shown in FIG. 1, a client 102 may seek to utilize a service 108, such as a multi-tenant compute provider that executes workflows on behalf of its tenants. A workflow, also referred to herein as a "process" or "task" or "application," may reflect a defined set of one or more operations that are executed on behalf of the client 102. Conceptually, a workflow may be represented as a graph of operations to be executed (corresponding to nodes of the graph) and may possibly include decision points that change the path followed in the graph (and accordingly, which nodes/operations are executed). An operation may include a call to another system to access some resource (e.g., to invoke a function, to read or update an object, etc.), a command to perform a local operation such as an addition or a "sleep" for a period of time, etc. However, the term "workflow" is to be interpreted broadly to include various types of processes, applications, tasks, etc., that can be executed and potentially require the need to access other resources.

At circle (A), a client 102 may transmit a create workflow 120 type request serving a register a particular workflow to be executed by the service 108, which may identify a workflow type (e.g., from a library of workflows), specify one or more operations and/or other logic to be executed, etc. The service 108 may thus create and store a workflow definition for the workflow (e.g., such as within a database or similar data structure). In some examples, the client 102 (e.g., via the create workflow 120 request) may define a workflow identifier (that is unique for the client or within some namespace), and/or the service 108 itself may create a client-unique (and/or universally unique) workflow identifier that may or may not be provided back to the client 102.

The service 108 thus "owns" the workflow definition, and can send a define tenant-specific security principal ("TSSP") 122 request at circle (B) to an authorization server 106 (e.g., of an authorization type service, such as an Identify and Access Management service, combined authentication and authorization service, etc., which could implement or utilize a version of a protocol such as OAuth, SAML (Security Assertion Markup Language), or the like) to create a security principal that is specific to the workflow, and thus, to the "tenant" associated with the client 102. This tenant-specific security principal 122 request may include one or more the above-referenced workflow identifiers, such that the client 102 and/or service 108 can again reference the workflow. In some examples, the authorization server 106 may also generate and return a TSSP identifier to the service 108 for later interactions.

As indicated, the service 108 is granted the ability to register such TSSPs with the authorization server 106; however, the service 108 may not have the ability to define/associate access grants/permissions for this TSSP. Instead, a resource owner 104 (e.g., an administrator or software program associated therewith) associated with the particular resource(s) utilized for the workflow can define TSSP grants, e.g., by causing (via some computing device) a define TSSP grant 124 request to be sent to the authorization server 106 at circle (C), which may include an identifier of the TSSP (generated by the authorization server 106 during TSSP definition) and/or an identifier of the workflow (e.g., generated by the client 102 and/or service 108 during the workflow creation process), together with grant data that is to be associated with the TSSP. Each grant may include, for example, an identifier of a resource (and/or a service that manages/hosts the resource) together with an identifier of a right to the resource (e.g., a type of access to the resource, such as the right to read it, update it, create it, delete it, call or perform a function, etc.). The right may also be complex and based on the use of logic to be evaluated for a request, such as the right to call a function to deduct an amount from an account balance, provided that the value is less than some threshold amount (e.g., one-hundred dollars). Such assignments can be made using any of a variety of known techniques, such as via the use of AAA (Authentication, Authorization, and Accounting) configuration techniques/messaging.

Thereafter, the client 102 may seek to have the workflow executed and may issue an execute workflow 126 request to the service 108. In some examples, the client 102 had already obtained or generated a grant to use to use the TSSP (e.g., via interaction with the authorization server 106, via self-generation, etc.), and may pass this grant along with the execute workflow 126 request to the service 108.

In some examples, the service 108 may send a request to use the TSSP 128 to the authorization server 106 at circle (E), which may include the grant provided to it by the client 102 allowing the service 108 to use the TSSP. The authorization server 106 can verify the validity of the grant and may allow the service 108 to act as the TSSP, e.g., via passing back an identity assertion allowing the service 108 to make requests 130 to the resource server(s) 110 at circle (F), via passing back an access token or other grant to use a resource similarly allowing the service 108 to make requests 130 to the resource server(s) 110 using the TSSP's grants.

In some examples, the authorization server 106 may record/store information (e.g., such as in the data store 207) indicating that this grant occurred, which can provide for subsequent auditing to closely track the usage of the TSSP's grants.

In some examples, the service 108 may itself "exchange" the security principal of the service 108 for that of the TSSP. Once the service 108 has the right to act as the TSSP, it can use the grants associated with the TSSP directly.

When the client 102 makes a request to the service 108, in some examples the request includes a grant in the request (at circle (D)) that allows the service 108 to obtain an assertion using the grants assigned to the client 102. The service 108 thus obtains an assertion from the authorization server 106 to make requests to the resource server(s) 110 using the client 102 grants containing the context of the TSSP.

In examples utilizing ones of these techniques, least privilege adherent access is granted to a service, such as a multi-tenant compute provider, where the multi-tenant compute provider need not have any default grants to access resources as part of executing tenant workflows. Further, the multi-tenant compute provider may have rights to define tenant-specific security principals, but not rights to assign grants to the TSSP, which may be allowed by another entity such as a resource owner or client. Thus, notably, the right to define a security principal is separated from the right to actually use the security principal, providing increased security.

Further, in some examples, an operation of a workflow (that has an associated TSSP) may be yet another workflow having its own associated TSSP, allowing for workflows to be combined and/or shared in a secure manner.

Figure 2:
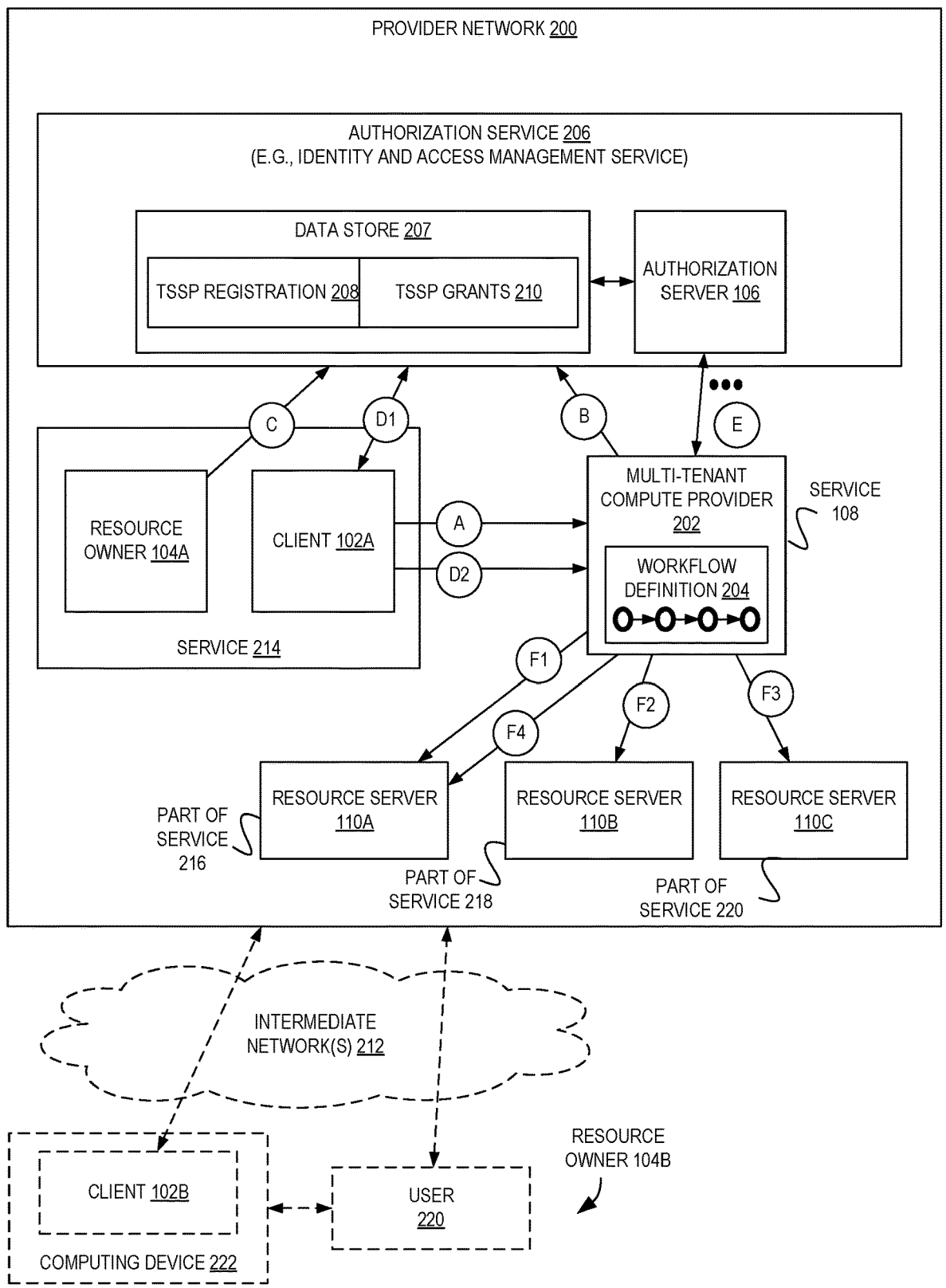
FIG. 2 is a diagram illustrating an environment implementing restricted access control in a multi-tenant system using tenant-specific security principals according to some examples.

For further illustration of these and other techniques, FIG. 2 is a diagram illustrating an environment implementing restricted access control in a multi-tenant system using tenant-specific security principals according to some examples. In FIG. 2, a multi-tenant compute provider 202 operating in a provider network 200 acts as the service 108 that executes workflows for clients (e.g., client 102A that itself here is executed as part of—or by—another service 214) via use of TSSPs to securely access resources provided or hosted by other resource servers 110A-110C.

A provider network 200 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services (e.g., service 214, 216, 218, 220, 108, and/or 206), such as a hardware virtualization service that can execute compute instances, a storage service that can store data objects, etc.

The users (or "customers") of provider networks 200 can use one or more user accounts that are associated with a customer account, though these terms can be used somewhat interchangeably depending upon the context of use. Users can interact with a provider network 200 across one or more intermediate networks 212 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 200 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Generally, the traffic and operations of a provider network can broadly be subdivided into two categories: control plane operations carried over a logical control plane, and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide computing resource services, provider networks 200 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code, typically without the user having any control of or knowledge of the underlying compute instance(s) involved.

In this example, the client 102A may be implemented by a service 214, and thus could be a portion of a software application (e.g., of a user or organization) executed in a hardware virtualization service, on-demand serverless code execution service, or the like. As shown at circle (A), the client 102A can issue a request to define a workflow with the multi-tenant compute provider 202—e.g., workflow definition 204, which represents a simple example workflow with a small graph of four nodes corresponding to four operations. The multi-tenant compute provider 202 can thus send a request at circle (B) to register a tenant-specific security principal (TSSP) with the separate authorization service 206 (e.g., an Identity and Access Management (IAM) service, a provider-network internal authentication and/or authorization service, etc.), which is recorded as a TSSP registration 208 in a data store 207 (e.g., a database, object, file, or other data structure).

Thereafter, the resource owner 104A—such as a software module executed by the service 214 (or other service) on behalf of the user 220 or organization, or as a user 220 utilizing a software program acting as a client 102B and executing on a computer device 222—can interact with the authorization service 206 at circle (C) to define rights for the TSSP in the form of TSSP grants 210, which can define access permissions for objects (or services, computing resources, etc.) that can be utilized by the associated TSSP.

Upon needing to execute the workflow (corresponding to the workflow definition 204), such as according to a schedule or a specific workflow execution request sent at circle (D2) by the client 102A that includes a grant to use the TSSP (e.g., obtained previously by the client 102A from the authorization service 206 as shown at circle (D1)), the multi-tenant compute provider 202 can transmit a request to an authorization server 106 to utilize the TSSP as shown by circle (E). Upon receiving an assertion back from the authorization service 206, in some examples the multi-tenant compute provider 202 can switch its principal to that of the TSSP and may issue one or multiple requests to perform one or more or all of the one or multiple operations of the workflow definition 204. For example, as shown in FIG. 2, the multi-tenant compute provider 202 can act as the TSSP to access resources for the workflow by sending requests to resource servers 110A-110C (e.g., of one or more services 216, 218, 220) as reflected by circles (F1)-(F4), though in various embodiments the resource servers can be inside the provider network, outside the provider network (e.g., in another cloud, in a data center, etc.), or a combination of both. For example, the first resource server 110A may operate as part of an object storage service 216 and the operation of circle (F1) could be to obtain (e.g., download) a file, circle (F2) could be to perform a query against a database table provided by a database service 218, circle (F3) could be to perform analysis using a "big data" type application and/or generate a machine learning (ML) inference provided by service 220, and circle (F4) could involve writing some resultant output to a storage location of the storage service 216, etc.

In some examples, the multi-tenant compute provider 202 can include authorization-type data (e.g., assertion data, grant data, etc.) obtained from the authorization service 206 at circle (D1) as part of circle (E) within requests (circles (F1)-(F4)) to the resource servers 110 that indicate, to the recipient(s), that the multi-tenant compute provider 202 (acting as the TSSP) has been authorized to perform a particular operation.

Additionally, in some examples, additional client information can be included within the requests (circles (F1)-(F4)) and/or included within the authorization type data included in those requests. This client information can include data that identifies the client 102A invoking the workflow, or authentication/authorization data corresponding to the client and/or workflow. The client information may come directly from the invoking client 102A, generated or looked up by the multi-tenant compute provider, and/or provided by the authorization service (e.g., as part of circle (E) or (D1)). In some examples, when making requests to resource server(s) 110, this additional client information can be included and thereby provide the recipient server with visibility into which client 102A is associated with the particular workflow being executed. This can allow the recipient resource server(s) to perform other actions, such as implementing more complex access controls. For example, it may be the case that a resource server may restrict access to a resource such that it may only be accessed only with a combination of authorization/authentication corresponding to both the client 102A and the workflow/multi-tenant compute provider 202—thus, the client 102A may not have permission alone, the workflow/multi-tenant compute provider 202 may not have permission alone, but if both are involved, then permission is granted.

However, in some examples it may be the case that the authorization reflected by circle (E) could be on a sub-workflow level, and thus provide authorization to perform only some (e.g., one or two) of the operations of the workflow. Thus, the multi-tenant compute provider 202 may need to perform the authorization multiple times for a workflow (e.g., to obtain an assertion/grant useful for only a limited set of resources), which can beneficially ensure that the multi-tenant compute provider 202 has extremely "limited" permissions at any one point in time, providing strong "least privilege" operational adherence.

As illustrated herein, it may be the case that various entities may be located in different places in different examples, and/or that various entities may perform different functionalities, and thus this depiction is not to be limiting but rather illustrative of one configuration. For example, the involved client 102A or 102B may be deployed within the provider network 200 or may execute outside of the provider network 200. Moreover, the resource owner 104A-104B may be a software module acting on behalf of a user 220 or organization and may be within the provider network 200 or outside of the provider network 200. In some examples, the client 102 itself may act as the resource owner 104. Further, the multi-tenant compute provider 202 may be another type of service 108 that can have tenant-specific resources (e.g., virtual machines or applications) and create TSSPs for these resources.

Figure 3:
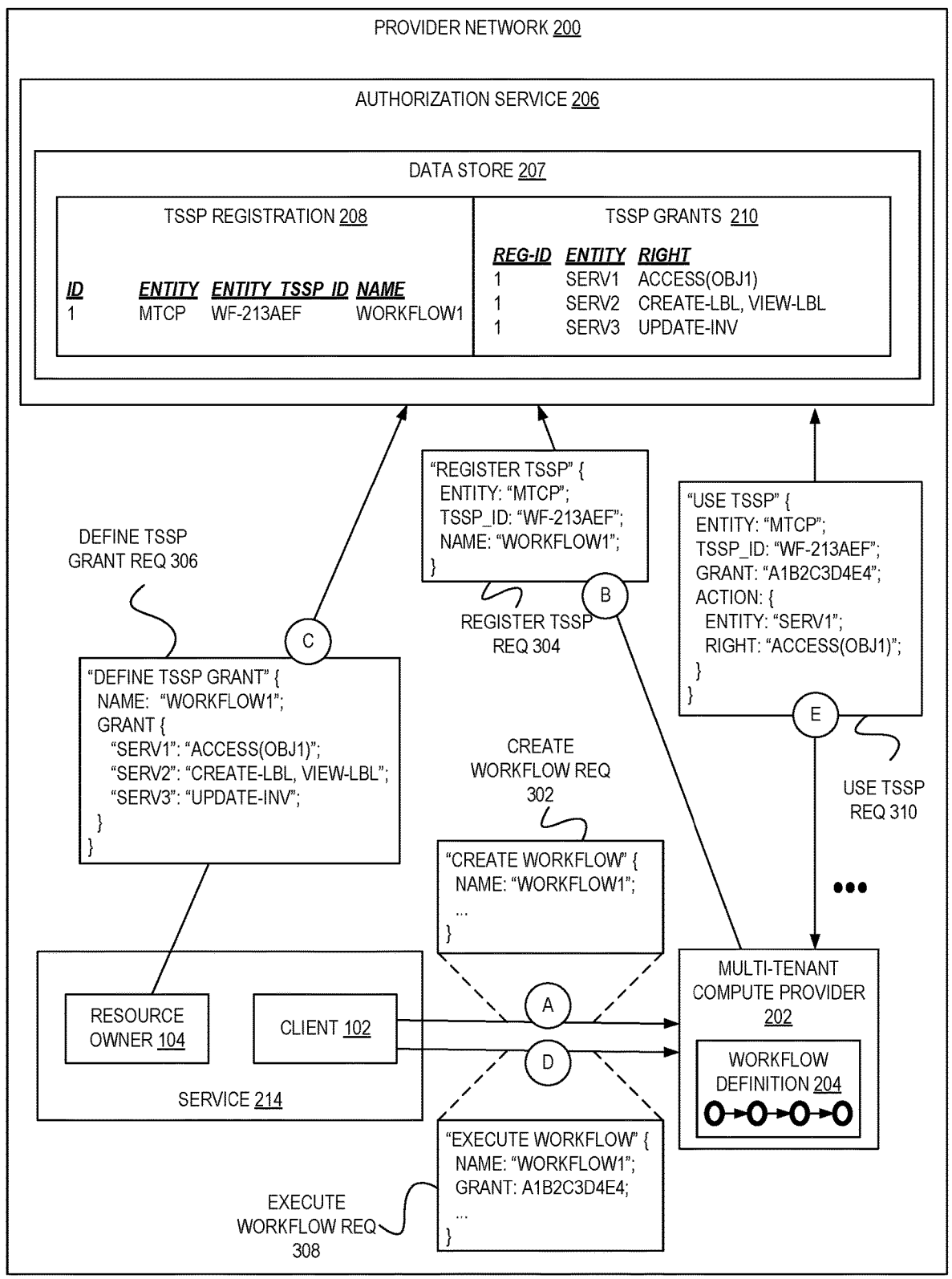
FIG. 3 is a diagram illustrating exemplary request messaging in an environment implementing restricted access control in a multi-tenant system using tenant-specific security principals according to some examples.

For a more specific example of one configuration, FIG. 3 is a diagram illustrating exemplary request messaging in an environment implementing restricted access control in a multi-tenant system using tenant-specific security principals according to some examples. This example is similar to the configuration presented in the earlier figures, and includes a client 102, resource owner 104, multi-tenant compute provider 202, and authorization service 206.

In this example, the client 102 may seek to create or register a resource with the multi-tenant compute provider 202—here, creating a workflow via transmitting a create workflow request 302 at circle (A) that specifies a client-provided name for the workflow ("WORKFLOW1") as well as data identifying what operations are part of the workflow, which is generated and saved by the multi-tenant compute provider 202 as workflow definition 204.

The multi-tenant compute provider 202 may then seek to register a tenant-specific security principal for the resource, here sending a Register TSSP request 304 including an identifier of the requesting entity (here, the multi-tenant compute provider 202), an identifier of the workflow used by the multi-tenant compute provider 202 (or within the provider network 200) in the form of a string "WF-213AEF", and a "name" associated with the workflow-here, the client-provided identifier of "WORKFLOW1". This information is stored by the authorization service 206 as a TSSP registration 208 in a data store 207, here shown as including the data from the request 304 along with a separate identifier (here, an auto-incrementing field serving as a key having a value of "1").

Thereafter, the resource owner 104 (directly when implemented as a software module, or indirectly when utilizing a software module) can send a Define TSSP Grant request 306 to the authorization service 206. This request 306 includes an identifier of the TSSP, which here can be the client-provided name of "WORKFLOW1" though other values could be used provided that they allow the authorization service 206 to identify the TSSP, such as the multi-tenant compute provider 202 generated identifier ("WF-213AEF") or even the authorization service 206 generated identifier ("1"), the latter two potentially being provided by the multi-tenant compute provider 202 back to the client 102 and/or resource owner 104 for use.

The Define TSSP Grant request 306 also includes a set of permissions or "grants" to be associated with the identified TSSP, here shown as a permission to access an object "OBJ1" with a first service "SERV1", execute functions "CREATE-LBL" and "VIEW-LBL" with a second service "SERV2", and execute an "UPDATE-INV" function with a third service "SERV3." This information can be persisted as a TSSP grant 210 in association with the corresponding TSSP, e.g., via a foreign key type relationship using an "REG-ID" column value (here, "1") that identifies a particular TSSP registration (via its "ID" column).

Thereafter, the client 102 can issue an Execute Workflow request 308 at circle (D) to the multi-tenant compute provider 202 seeking to execute the workflow. The Execute Workflow request 308 may include an identifier of the workflow (e.g., name of "WORKFLOW1") and data representing a grant, to the multi-tenant compute provider 202, to utilize the TSSP associated with the workflow. This grant may have been obtained by the client 102 (e.g., via interaction with the authorization service 206) or generated/obtained by the client 102 in another manner known by those of skill in the art.

Based on this grant data, the multi-tenant compute provider 202 in seeking to execute the workflow may send a Use TSSP request 310 to the authorization service 206 seeking to switch its role to that of the TSSP. The Use TSSP request 310 can include, for example, an identifier of the caller (e.g., a name, network address, etc. —here, "MTCP" representing the multi-tenant compute provider 202), an identifier of the TSSP (here, corresponding to a particular workflow) that is sought to be accessed (e.g., "WF-213AEF"), grant data from or based on the grant from the execute workflow request, and optionally an indicator of what type of operation from the workflow is currently sought to be performed (e.g., a need to interact with service "SERV1" to access an object "OBJ1").

The authorization service 206 (e.g., via the non-illustrated authorization server 106) can approve or deny of this request, e.g., by determining whether the particular right/grant is valid for the requested action and caller, etc., and can return an assertion or similar authorization to perform (or not perform) one or multiple of the operations of the workflow.

Figure 4:
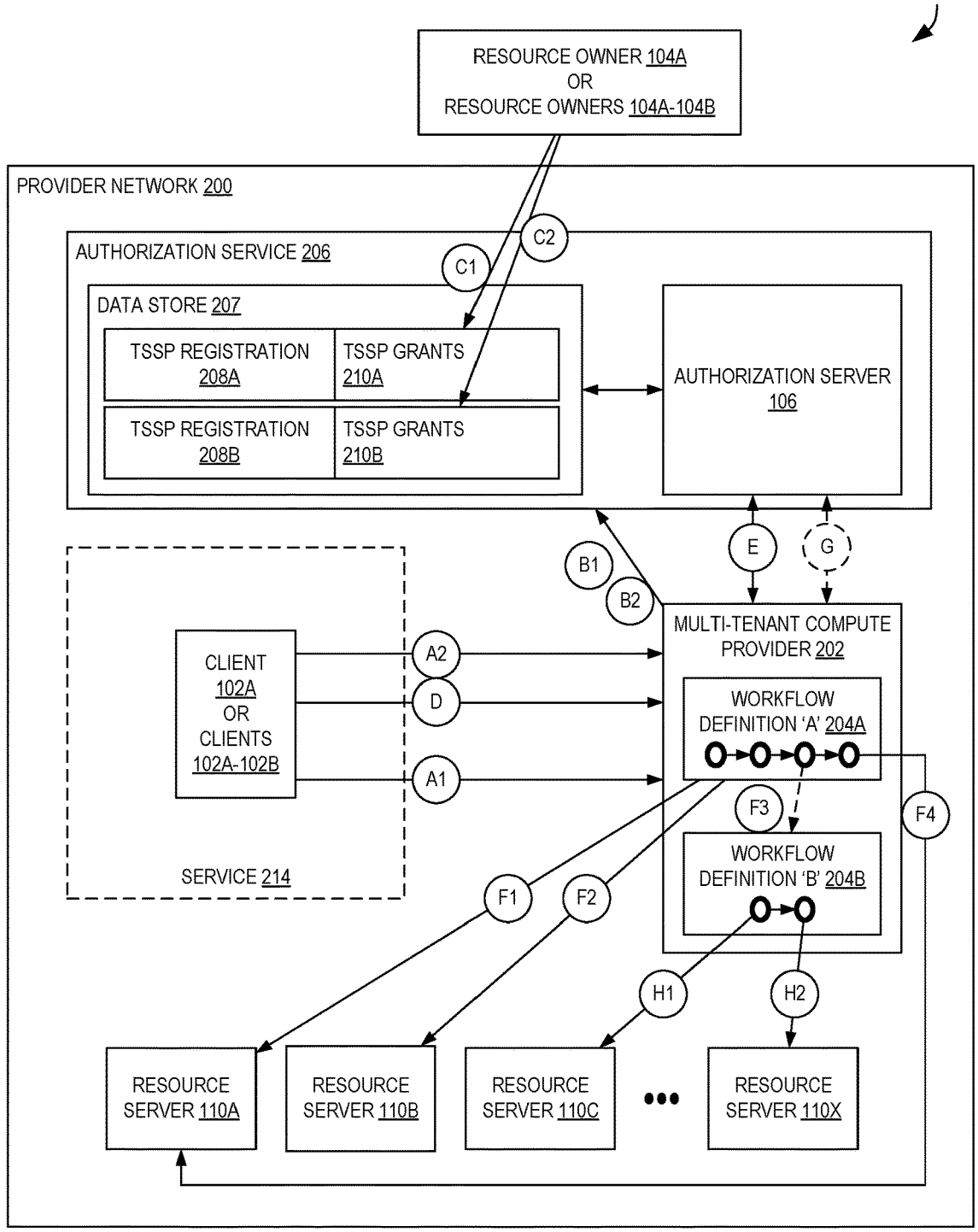
FIG. 4 is a diagram illustrating single workflow multi-level access control in an environment implementing restricted access control in a multi-tenant system using tenant-specific security principals according to some examples.

FIG. 4 is a diagram illustrating single workflow multi-level access control in an environment 400 implementing restricted access control in a multi-tenant system using tenant-specific security principals according to some examples. In some examples, multiple different TSSPs may be utilized during the course of the use of one resource, e.g., during the execution of a particular workflow. Advantageously, this can allow for different rights to be securely granted for different resources, which may potentially be controlled by different resource owners. Moreover, multiple-TSSP usage can allow for the construction of workflows with more complex access patterns in a straightforward yet secure manner.

As shown in FIG. 4, a workflow with an associated TSSP can reference yet another workflow with a separate associated TSSP. In this example, a first client (e.g., client 102B) at circle (A1) may define/create a first workflow with the multi-tenant compute provider 202 as workflow definition 'B' 204B (including two operations), causing the multi-tenant compute provider 202 to register a TSSP for this workflow with the authorization service 206 as TSSP registration 208B at circle (B1). Thereafter, a resource owner (e.g., resource owner 104B) can define a set of TSSP grants 210B for the associated TSSP registration 208B at circle (C1).

Continuing this example, the same client 102B or a second client 102A at circle (A2) may define/create a second workflow with the multi-tenant compute provider 202 as workflow definition 'A' 204A (including four operations, one of which involves invoking the first workflow), causing the multi-tenant compute provider 202 to register another TSSP for this workflow with the authorization service 206 as TSSP registration 208A at circle (B2). Thereafter, the same resource owner 102B or another resource owner 104A can define a set of TSSP grants 210A for the associated second TSSP registration 208A.

Accordingly, the second workflow (corresponding to workflow definition 'A' 204A) can be used with a first TSSP, and another TSSP can be used to execute the first workflow (corresponding to workflow definition 'B' 204B). Thus, the multi-tenant compute provider 202 may need to use two different TSSPs during the execution of the second workflow, which may require obtaining two different assertions (indicating an authorization to use these TSSPs). To this end, in some examples the workflow-invoking client (here, client 102A) may need to obtain and provide (to the multi-tenant compute provider 202, such as within the execute workflow request) a first assertion to use the TSSP corresponding to workflow 'A' as well as a second assertion to use the TSSP corresponding to workflow 'A'. Alternatively, workflow definition 'A' 204A may include an operation (or associated metadata) that indicates that the multi-tenant compute provider 202 is to send a request to obtain an assertion (e.g., to client 102B, to the authorization service 206, etc.) to use the TSSP corresponding to workflow 'B'.

Thus, as shown in FIG. 4, the multi-tenant compute provider 202 can send a request to use the TSSP corresponding to workflow 'A' at circle (E)—which may occur one time or multiple times (e.g., once per different involved resource server 110)—and begin performing operations for the workflow as reflected by invocations/transmissions corresponding to circles (F1) and (F2). To perform the third operation of the workflow, the multi-tenant compute provider 202 may invoke the workflow 'B' and thereafter send a request at circle (G) to use the TSSP corresponding to workflow 'B', which again may be based on use of assertion data (e.g., provided by one of the clients 102, the authorization service 206 itself, or another software-based system executed within the provider network 200 or elsewhere).

The multi-tenant compute provider 202 may thus perform the operations of the workflow 'B' as reflected by invocations/transmissions corresponding to circles (H1) and (H2), which may include the use of assertion data (e.g., an encrypted token reflecting the assertion) in these requests. Thereafter, with workflow 'B' being complete, the multi-tenant compute provider 202 can continue with the successive operations of the workflow 'A', here shown as the request to access a resource with resource server 110A via circle (F4), which may include the use of assertion data (e.g., a token) obtained via use of the TSSP corresponding to workflow 'A'.

Notably, the terminology and specific operations shown in these figures are to be understood as examples of some systems that can be constructed using TSSPs with split registration and grants assignment rights. Thus, many different configurations can be created by those of skill in the art in possession of this disclosure regarding TSSPs with split registration and grants assignment rights, and thus the described systems (e.g., multi-tenant compute provider 202) can be different, the types and/or locations of clients 102 and resource owners 104 can be different, the different ways to use a TSSP can be different, the different ways to use assertions and grants can be different, etc., in various deployments without departing from the subject matter of this disclosure.

Figure 5:
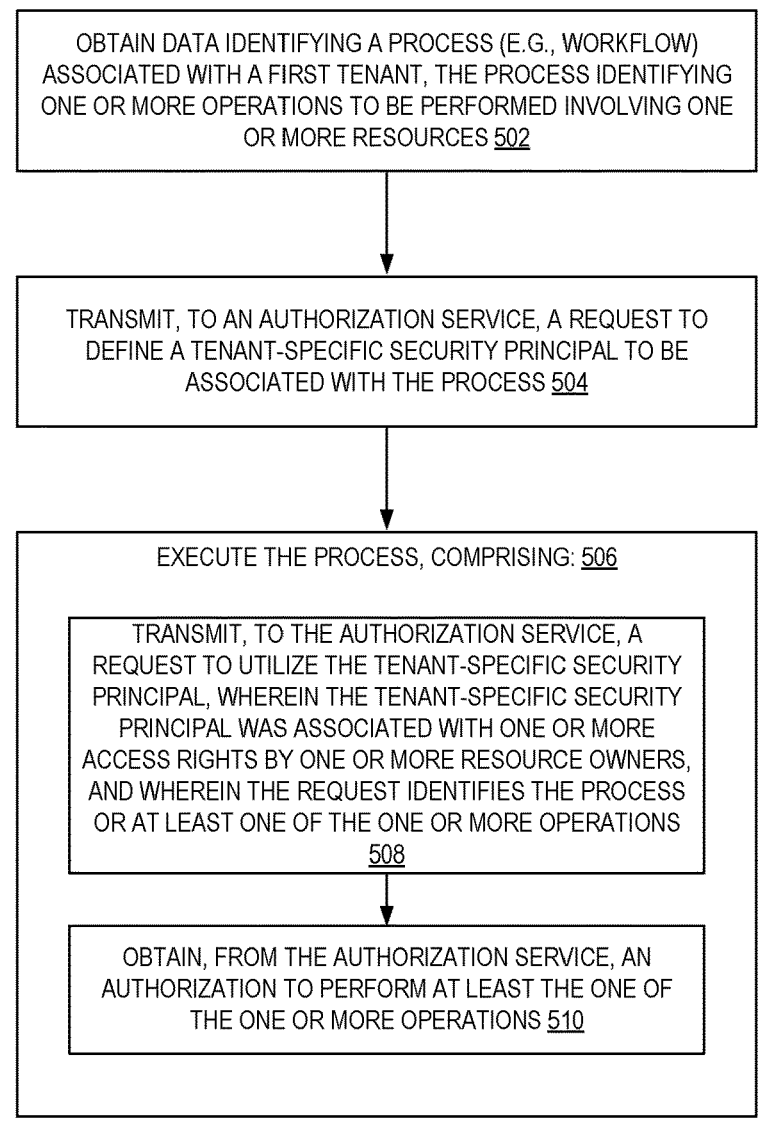
FIG. 5 is a flow diagram illustrating operations of a method for restricted access control in multi-tenant systems using tenant-specific security principals according to some examples.

FIG. 5 is a flow diagram illustrating operations of a method for restricted access control in multi-tenant systems using tenant-specific security principals according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by the multi-tenant compute provider 202 of the other figures.

The operations 500 include, at block 502, obtaining data identifying a process (e.g., a workflow, application, etc.) associated with a first tenant, the process identifying one or more operations to be performed involving one or more resources. In some examples, the obtaining of the data identifying the process associated with the first tenant comprises: receiving, at the multi-tenant compute provider, a request to create the process (e.g., a request to create a workflow).

The operations 500 further include, at block 504, transmitting, by the multi-tenant compute provider to an authorization service, a request to define a tenant-specific security principal to be associated with the process. In some examples, the request to define the tenant-specific security principal includes at least an identifier of the multi-tenant compute provider and an identifier of the process.

In some examples, the operations 500 further include receiving a request to execute the process, wherein the request includes a grant to use the tenant-specific security principal, and wherein the request to utilize the tenant-specific security principal includes the grant.

The operations 500 further include, at block 506, executing the process. Block 506 includes block 508, which includes transmitting, to the authorization service, a request to utilize the tenant-specific security principal, wherein the tenant-specific security principal was associated with one or more access rights by one or more resource owners, and wherein the request identifies the process or at least one of the one or more operations. In some examples, the request to utilize the tenant-specific security principal seeks authorization to perform the entire process. In some examples, the request to utilize the tenant-specific security principal seeks authorization to perform only a portion of the process.

Block 506 also includes block 510, which includes obtaining, from the authorization service, an authorization to perform at least the one of the one or more operations. In some examples, the authorization is to perform only the one operation; and the executing of the process further includes sending a request to a service to perform the one operation involving a resource managed by the service, the request including data based on the authorization obtained from the authorization service. In some examples, the request to the service further includes an identifier associated with the first tenant (e.g., a client identifier such as a name, authorization, authentication, or the like), whereby the service makes an access control determination based on the data (based on the authorization) and also the identifier associated with the first tenant. In some examples, the operations 500 further include transmitting, to the authorization service, a second request to utilize the tenant-specific security principal, wherein the request identifies a second operation of the one or more operations; obtaining, from the authorization service, a second authorization to perform the second operation; and transmitting a request to the service or another service to perform the second operation, the request including data based on the second authorization obtained from the authorization service.

In some examples, the one or more access rights associated with the tenant-specific security principal involve access permissions granted for resources managed by one or more services in a provider network.

In some examples, the multi-tenant compute provider is granted permission to define the tenant-specific security principal but not to associate access rights with the tenant-specific security principal; and the resource owner is granted permission to associate access rights with the tenant-specific security principal but not to define the tenant-specific security principal.

In some examples, the operations 500 further include receiving, by the authorization service from a computing device of the resource owner, a request to associate the one or more access rights with the tenant-specific security principal, wherein each of the one or more access rights specifies a permission or function associated with a separate service or resource.

Figure 6:
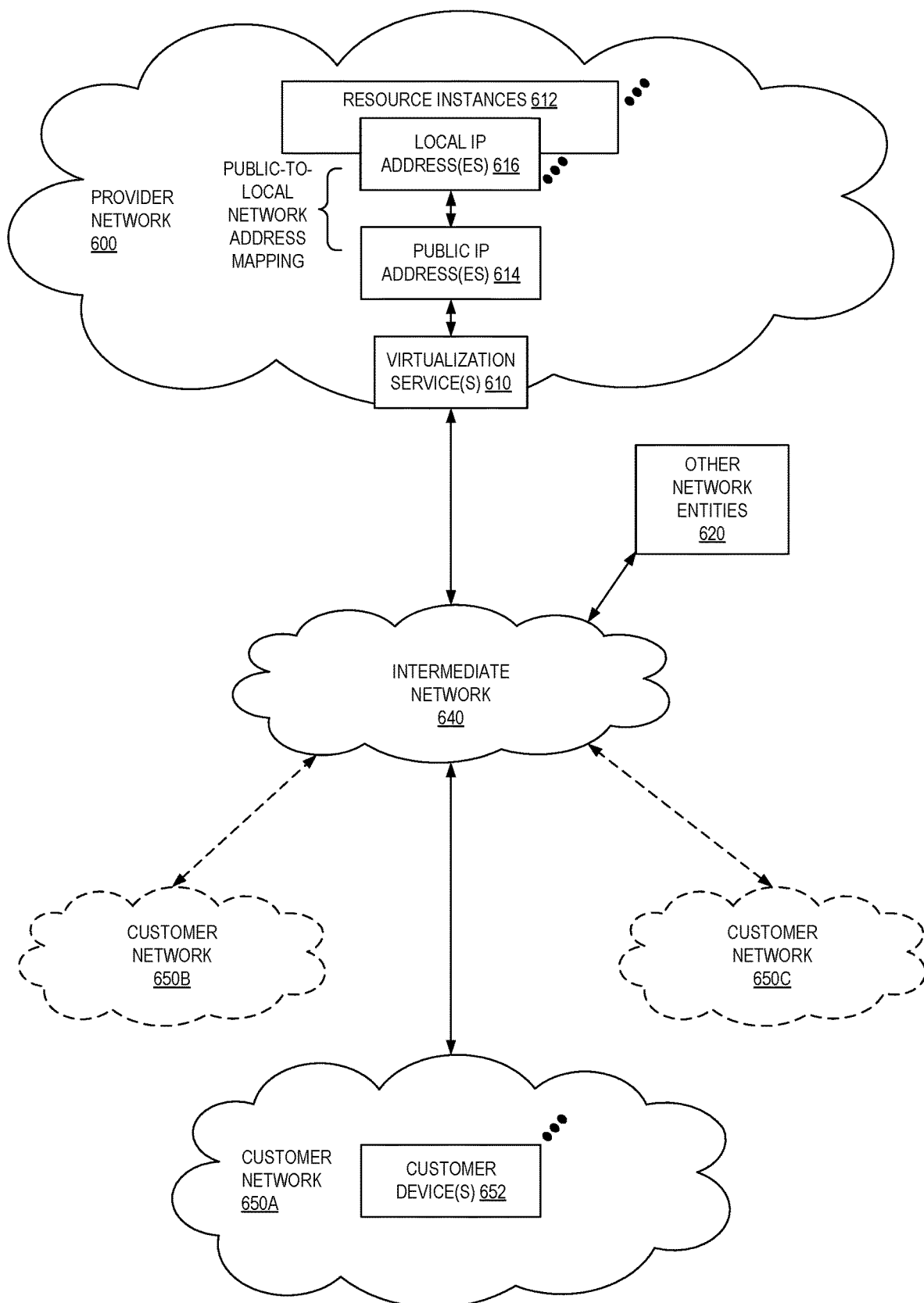
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
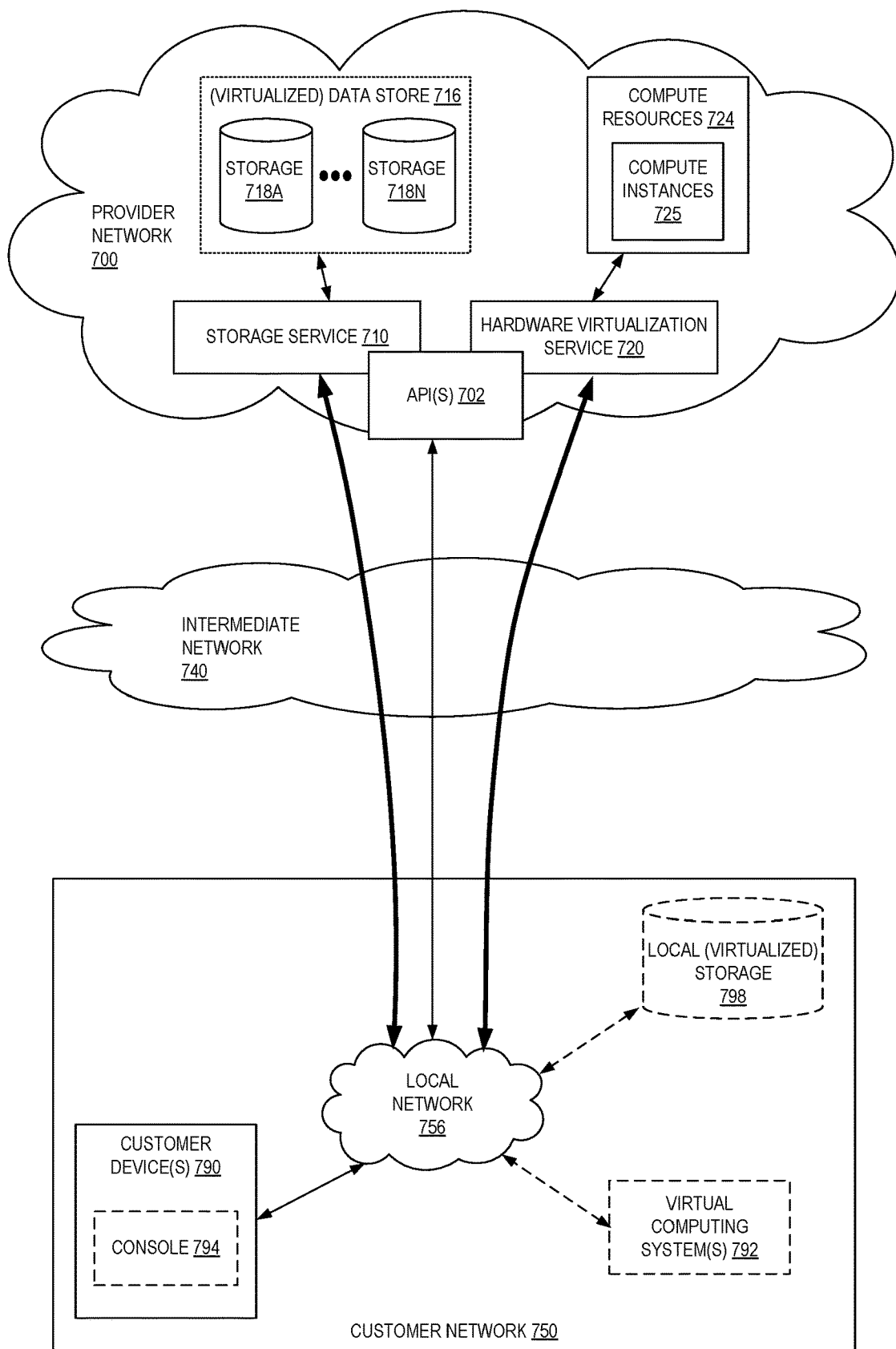
FIG. 7 is a block diagram of an example provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
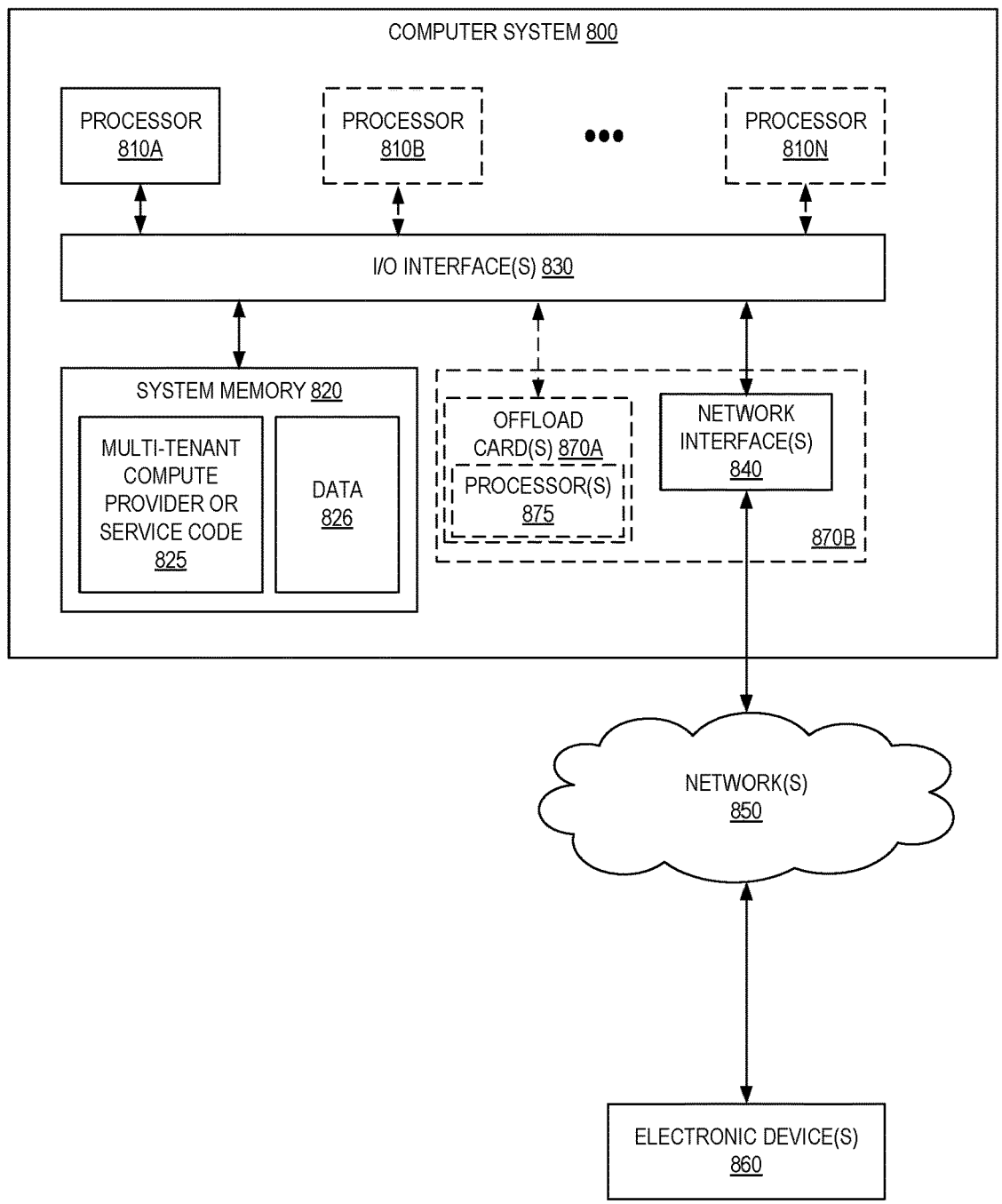
FIG. 8 is a block diagram illustrating an example computer system that can be used in some examples.

In some examples, a system that implements a portion or all of the techniques described herein can include a general-purpose computer system, such as the computer system 800 illustrated in FIG. 8, that includes, or is configured to access, one or more computer-accessible media. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as multi-tenant compute provider 202 and/or service 108 code 825 (e.g., executable to implement, in whole or in part, the multi-tenant compute provider 202 or service 108) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computer system 800. However, in some examples the virtualization manager implemented by the offload card(s) 870A or 870B can accommodate requests from other entities (e.g., from compute instances themselves), and cannot coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, at a multi-tenant compute provider service of a cloud provider network, a request to create a workflow associated with a first tenant, the request comprising data identifying the workflow that identifies one or more operations to be performed involving one or more resources;
   transmitting, by the multi-tenant compute provider service to an authorization server, a request to define a tenant-specific security principal (TSSP) to be associated with the workflow;
   receiving, at the authorization server from a computing device of a resource owner, a request to associate one or more access rights with the TSSP, wherein each of the one or more access rights specifies a permission or function associated with a separate service or resource in the cloud provider network;
   receiving, at the multi-tenant compute provider service, a request to execute the workflow; and
   executing, by the multi-tenant compute provider service, the workflow, comprising:
      transmitting, to the authorization server, a request to utilize the TSSP, wherein the request identifies the workflow or at least one of the one or more operations;
      obtaining, from the authorization server, an authorization to utilize the TSSP to perform at least the one of the one or more operations; and
      sending a request to access a resource, the request including the authorization.

2. The computer-implemented method of claim 1, wherein the request to execute the process includes a grant to use the TSSP.

3. The computer-implemented method of claim 1, wherein:
   the multi-tenant compute provider has permission to define the tenant-specific security principal but not to associate access rights with the tenant-specific security principal; and
   the resource owner has permission to associate access rights with the tenant-specific security principal but not to define the tenant-specific security principal.

4. A computer-implemented method comprising:
   obtaining, by a multi-tenant compute provider service, data identifying a process associated with a first tenant, the process identifying one or more operations to be performed involving one or more resources;
   transmitting, by the multi-tenant compute provider service to an authorization server, a request to define a tenant-specific security principal (TSSP) to be associated with the process;
   receiving, by the authorization server from a computing device of a resource owner, a request to associate one or more access rights with the TSSP, wherein each of the one or more access rights specifies a permission or function associated with a separate service or resource;

executing, by the multi-tenant compute provider service, the process, comprising:
transmitting, to the authorization server, a request to utilize the TSSP, wherein the request identifies the process or at least one of the one or more operations; and
obtaining, from the authorization server, an authorization to utilize the TSSP to perform at least the one of the one or more operations.

5. The computer-implemented method of claim 4, further comprising receiving a request to execute the process, wherein the request includes a grant to use the TSSP.

6. The computer-implemented method of claim 4, wherein the one or more access rights associated with the TSSP involve access permissions granted for resources managed by one or more services in a provider network.

7. The computer-implemented method of claim 4, wherein:
the multi-tenant compute provider service is granted permission to define the TSSP but not to associate access rights with the TSSP; and
the resource owner is granted permission to associate access rights with the TSSP but not to define the TSSP.

8. The computer-implemented method of claim 4, wherein:
the authorization is to perform only the one operation; and
the executing of the process further includes sending a request to a service to perform the one operation involving a resource managed by the service, the request including data based on the authorization obtained from the authorization server.

9. The computer-implemented method of claim 8, further comprising:
transmitting, to the authorization server, a second request to utilize the TSSP, wherein the request identifies a second operation of the one or more operations;
obtaining, from the authorization server, a second authorization to perform the second operation; and
transmitting a request to the service or another service to perform the second operation, the request including data based on the second authorization obtained from the authorization server.

10. The computer-implemented method of claim 4, wherein the executing of the process further includes:
sending, by the multi-tenant compute provider, a request to a service to perform at least the one of the one or more operations of the process, the request including both:
data based on the authorization obtained from the authorization server, and
an identifier associated with the first tenant, whereby the service makes an access control determination based at least in part on both the data based on the authorization and also the identifier associated with the first tenant.

11. The computer-implemented method of claim 4, wherein the request to define the TSSP includes at least an identifier of the multi-tenant compute provider and an identifier of the process.

12. The computer-implemented method of claim 4, wherein the request to utilize the TSSP seeks authorization to perform the entire process.

13. The computer-implemented method of claim 4, wherein the request to utilize the TSSP seeks authorization to perform only a portion of the process.

14. The computer-implemented method of claim 4, further comprising:
receiving, by the authorization server from a computing device of the resource owner, a request to associate the one or more access rights with the TSSP, wherein each of the one or more access rights specifies a permission or function associated with a separate service or resource.

15. A system comprising:
a first one or more electronic devices to implement a compute provider service in a multi-tenant provider network, the compute provider service including instructions that upon execution cause the compute provider service to:
obtain data identifying a process associated with a first tenant, the process identifying one or more operations to be performed involving one or more resources;
transmit, to an authorization server, a request to define a tenant-specific security principal (TSSP) to be associated with the process; and
execute the process, comprising:
transmitting, to the authorization server, of a request to utilize the TSSP, wherein the request identifies the process or at least one of the one or more operations; and
obtaining, from the authorization server, an authorization to utilize the TSSP to perform at least the one of the one or more operations; and
a second one or more electronic devices to implement the authorization server in the multi-tenant provider network, the authorization server including instructions that upon execution cause the authorization server to:
receive, from a computing device of a resource owner, a request to associate one or more access rights with the TSSP, wherein each of the one or more access rights specifies a permission or function associated with a separate service or resource.

16. The system of claim 15, wherein the compute provider service further includes instructions that upon execution cause the compute provider service to:
receive a request to execute the process, wherein the request includes a grant to use the TSSP.

17. The system of claim 15, wherein the one or more access rights associated with the TSSP involve access permissions granted for resources managed by one or more services in the multi-tenant provider network.

18. The system of claim 15, wherein:
the compute provider service is granted permission to define the security principal but not to associate access rights with the security principal; and
the resource owner is granted permission to associate access rights with the security principal but not to define the security principal.

19. The system of claim 15, wherein:
the authorization is to perform only the one operation; and
the execution of the process further includes sending a request to a service to perform the one operation involving a resource managed by the service, the request including data based on the authorization obtained from the authorization server.

20. The system of claim 15, wherein each of the one or more access rights specifies a permission or function associated with a separate service or resource within the multi-tenant provider network.

* * * * *